(12) United States Patent
Heuer

(10) Patent No.: US 7,216,026 B2
(45) Date of Patent: May 8, 2007

(54) VEHICLE-DYNAMICS CONTROL METHOD AND SYSTEM FOR A VEHICLE TRAIN

(75) Inventor: Bernd Heuer, Nordstemmen (DE)

(73) Assignee: WABCO GmbH & Co. OHG, Hannover (DE)

( * ) Notice: Subject to any disclaimer, the term of this patent is extended or adjusted under 35 U.S.C. 154(b) by 53 days.

(21) Appl. No.: 10/756,677

(22) Filed: Jan. 13, 2004

(65) Prior Publication Data

US 2004/0148085 A1    Jul. 29, 2004

(30) Foreign Application Priority Data

Jan. 14, 2003   (DE)   ............... 103 01 096

(51) Int. Cl.
*B60T 8/00*  (2006.01)
*B62D 61/00* (2006.01)

(52) U.S. Cl. .................. 701/70; 180/282; 280/428

(58) Field of Classification Search .......... 701/70, 701/48, 78, 83, 72, 91; 180/282; 280/428, 280/432, 5.507, 433; 303/123, 124, 7, 15, 303/3, 22.1, 119.2, 9.69; 340/431; 188/122 R, 188/3 H, 3 R, 112 R
See application file for complete search history.

(56) References Cited

U.S. PATENT DOCUMENTS

| | | | | |
|---|---|---|---|---|
| 3,503,654 A | * | 3/1970 | Stamm ................. | 303/156 |
| 3,804,999 A | * | 4/1974 | Hubbard .............. | 200/80 R |
| 3,993,362 A | * | 11/1976 | Kamins et al. ........ | 303/146 |
| 4,804,237 A | * | 2/1989 | Gee et al. ............ | 303/7 |
| 5,001,639 A | * | 3/1991 | Breen ................. | 701/70 |
| 5,333,940 A | * | 8/1994 | Topfer ............... | 303/7 |
| 5,380,072 A | * | 1/1995 | Breen ................. | 303/7 |
| 5,620,236 A | * | 4/1997 | McGrath et al. ...... | 303/7 |
| 6,068,352 A | * | 5/2000 | Kulkarni et al. ..... | 303/20 |
| 6,079,790 A | * | 6/2000 | Broome .............. | 303/3 |
| 6,176,555 B1 | | 1/2001 | Semsey | |
| 6,272,420 B1 | * | 8/2001 | Schramm et al. ..... | 701/72 |
| 6,273,522 B1 | * | 8/2001 | Feetenby et al. ..... | 303/7 |
| 6,327,903 B1 | | 12/2001 | Hecker et al. | |
| 6,553,284 B2 | | 4/2003 | Holst et al. | |
| 6,668,225 B2 | * | 12/2003 | Oh et al. ............ | 701/70 |

FOREIGN PATENT DOCUMENTS

| | | |
|---|---|---|
| DE | 196 02 879 C1 | 8/1997 |
| DE | 100 17 045 A1 | 10/2001 |
| EP | 1 167 141 A1 | 1/2002 |

\* cited by examiner

*Primary Examiner*—Dalena Tran
(74) *Attorney, Agent, or Firm*—Kramer Levin Naftalis & Frankel LLP

(57) ABSTRACT

A vehicle-dynamics control method and system for a vehicle train comprising a tractor vehicle and a trailer vehicle. The vehicle-dynamics control system provided in the tractor vehicle, on the basis of vehicle-dynamics signals measured in the tractor vehicle, delivers brake-demand values (BAW) to the trailer vehicle. The trailer vehicle is equipped with a brake system, in which the brakes of the trailer vehicle can be actuated on the basis of the BAW. The vehicle-dynamics control method and system use data signals received from the trailer vehicle and calculates the BAW and permits activation of the brake system of the trailer vehicle while at the same time avoiding an undesirably large reduction of the cornering forces on the wheels of the trailer vehicle.

14 Claims, 3 Drawing Sheets

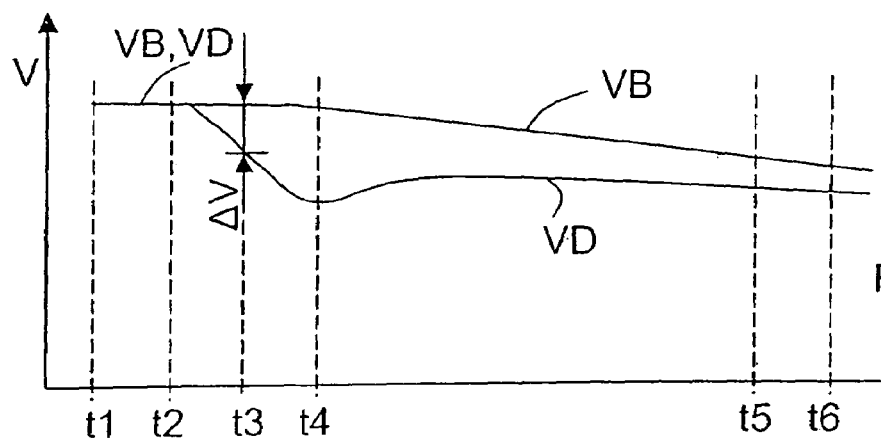
Fig.2a
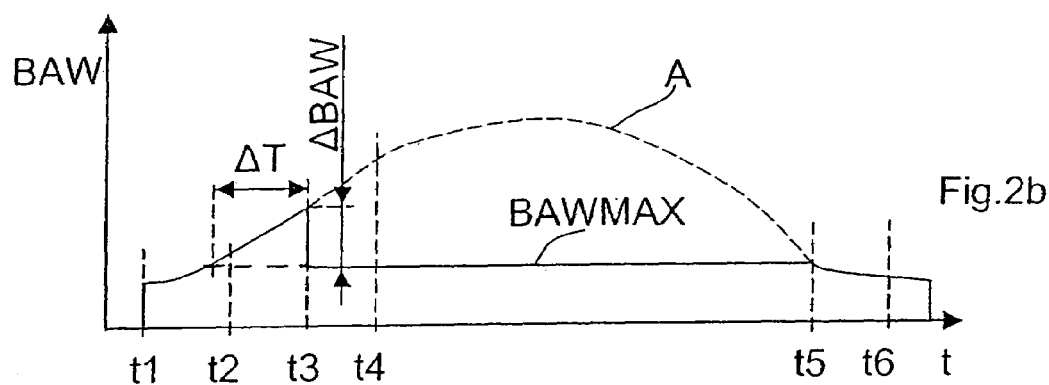
Fig.2b
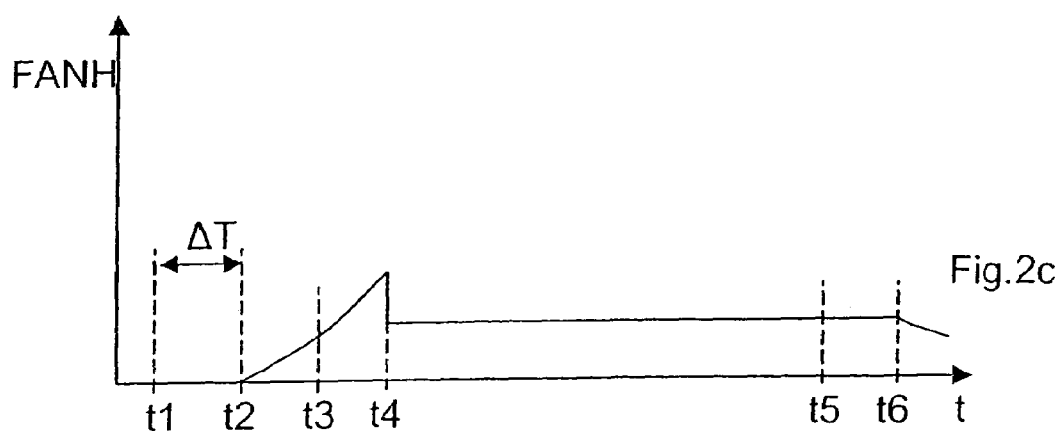
Fig.2c
Fig.2

VEHICLE-DYNAMICS CONTROL METHOD AND SYSTEM FOR A VEHICLE TRAIN

BACKGROUND OF THE INVENTION

The present invention is directed generally to a method and system for control of the vehicle dynamics of a vehicle train.

Vehicle-dynamics control methods rely on selective automatic actuation of an engine controller and/or of individual wheel brakes of the vehicle in order to prevent unsafe driving conditions, such as oversteering, understeering or skidding, or at least to reduce the consequences thereof. In the field of commercial vehicles, a technique known for a vehicle train comprising a tractor vehicle and a trailer vehicle is to provide a vehicle-dynamics control system in the tractor vehicle. In performing a vehicle-dynamics control method, this vehicle-dynamics control system also involves the trailer vehicle in the control process to the extent that, in certain driving situations, a preprogrammed brake-pressure command is transmitted to the trailer vehicle, for example via a trailer control valve or a data interface. Thus, in the identified driving situations, a braking effect by which the handling of the entire vehicle train can be stabilized is applied to the trailer vehicle in order to prevent, for example, jackknifing of the vehicle train or severe skidding.

On roadways with a relatively low coefficient of friction, the preprogrammed brake-pressure command may already lead under certain circumstances to an undesired reduction of the cornering forces on the wheels of the trailer vehicle, even before an anti-lock braking system in the trailer vehicle has time to respond. Maintenance of adequate cornering forces, however, is important for effective stabilization of the handling of the vehicle train.

It is desired to provide a vehicle-dynamics control method and system for a vehicle train that permits activation of the brake system of the trailer vehicle while at the same time avoiding an undesirably large reduction of the cornering forces on the wheels of the trailer vehicle.

SUMMARY OF THE INVENTION

Generally speaking, in accordance with the present invention, a vehicle dynamics control method and system for a vehicle train (comprising a tractor vehicle and a trailer vehicle) is provided which improves over prior art methods and systems.

In a preferred embodiment of the method and system according to the present invention, the vehicle-dynamics control system accepts vehicle-dynamics data signals from the trailer vehicle and calculates and delivers brake-demand values (BAW) to the trailer vehicle based on such data signals. The trailer vehicle is equipped with a brake system, in which the brakes of the trailer vehicle can be actuated on the basis of the BAW.

The term "brake-demand value" (or "BAW") is used herein as a collective term for the various ways in which the brake system of the trailer vehicle can be actuated from the tractor vehicle. This term should be understood to include all types of information transmitted from the tractor vehicle to the trailer vehicle that lead to actuation of the brake system of the trailer vehicle. Examples include a preprogrammed brake-pressure command via a trailer-control valve or the transmission of a brake-actuation value via an electronic data interface.

The present invention has the advantage that the handling of the vehicle train is made safer and unstable driving situations are better counteracted with relatively little complexity. Since conventional methods do not provide for inclusion of data of the trailer vehicle in the control strategy, they are unable to allow for the reaction of the trailer vehicle to the preprogrammed brake-pressure command. By virtue of the invention this is now made possible in a way that is simple to implement. On the whole, therefore, driving safety is improved.

In an advantageous embodiment of the present invention, trailer vehicle data can be used in accordance with International Organization for Standardization ("ISO") Standard 11992. Thus, compatibility between tractor vehicles and trailer vehicles of different manufacturers is ensured in a simple manner.

Accordingly, it is an object of the present invention to provide an improved method and system for vehicle dynamics control for a vehicle train that permits activation of the brake system of the trailer vehicle, while at the same time avoiding an undesirably large reduction of the cornering forces on the wheels of the trailer vehicle.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which:

FIGS. 2a–2c are timing diagrams illustrating the time variation of speed signals, brake-demand values and brake force of the trailer vehicle in accordance with the present invention.

DETAILED DESCRIPTION OF THE PREFERRED EMBODIMENTS

Figure 1:
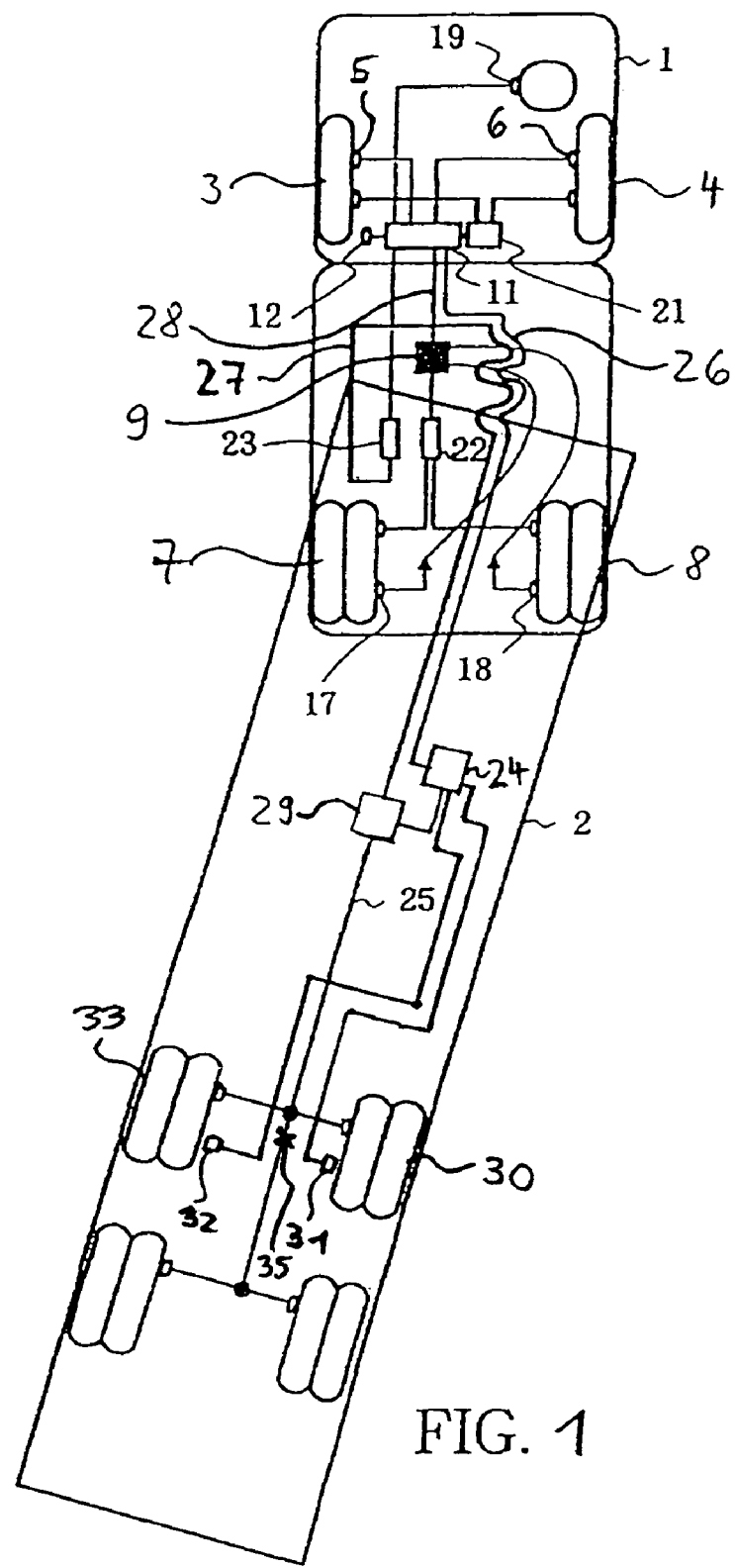
FIG. 1 is a bottom view of a vehicle train according to a preferred embodiment of the present invention.

Referring now to the drawing figures, FIG. 1 shows a vehicle train with a tractor vehicle (1) to which a trailer vehicle (2) is coupled. The tractor vehicle is provided with a steerable front axle, to which wheels (3, 4) are allocated, as well as with a rear axle, to which wheels (7, 8) are allocated. Braking force can be applied to wheels (3, 4, 7, 8) via wheel brakes allocated to the wheels. Hereinafter, it will be assumed that tractor vehicle (1) is equipped with a pressurized-fluid brake system having an electronic control unit, such as an electrically controlled brake system (EBS). It should be understood, however, that the invention can also be used advantageously with other types of brake systems, such as brakes actuated by purely electromechanical means. Furthermore, a vehicle-dynamics control system can be provided in the tractor vehicle (1).

Provided in tractor vehicle (1) is a control device (11), which is used for control of various brake functions on the front axle of tractor vehicle (1). Control device (11) can be designed, for example, as an EBS control unit. For this purpose, control device (11) is electrically connected to a valve device (21), by means of which controlled brake pressure can be injected into the wheel brakes of wheels (3, 4). A control module (9) is provided for control of the wheel brakes of wheels (7, 8) allocated to the rear axle. Control module (9) is electrically connected to a further valve device (22), by means of which controlled brake pressure can be injected into the wheel brakes of wheels (7, 8). Control module (9) is connected via a data circuit (28) to control device (11) for the purpose of data exchange.

Control module (9) receives, via electrical circuits, speed signals from speed sensors (17, 18), which are disposed on wheels (7, 8) and by means of which the speeds of rear wheels (7, 8) can be determined. Control device (11) is electrically connected to speed sensors (5, 6), by means of which the speeds of front wheels (3, 4) can be determined. Via data circuit (28), control device (11) receives, from the other control device (9), signals that represent the speeds of rear wheels (7, 8) of tractor vehicle (1).

The vehicle-dynamics control system is also integrated in control device (11). To measure physical variables that are necessary for vehicle-dynamics control, a steering-angle sensor (19) as well as a lateral-acceleration sensor (12) are electrically connected to control device (11) which also has an integrated yaw-rate sensor for measurement of the yaw rate. It should be understood, however, that the yaw-rate sensor may be located outside of the control device (11). From the signals of these sensors, the signals of speed sensors (5, 6, 17, 18) and, if necessary, further signals, vehicle-dynamics values are calculated, in control device (11) that then indicate unstable vehicle handling and possibly a need for automatic intervention in the engine controller or in the brake system in order to stabilize the handling. Control device (11) then executes such interventions by, for example, actuation of the wheel brakes of wheels (3, 4, 7, 8) or by transmission of a brake-demand value to trailer vehicle (2).

Trailer vehicle (2) is also provided with a brake system that is operated by pressurized fluid and that can be actuated via a brake line (25). A trailer control valve (23) for controlling the braking of trailer vehicle (2) is provided in tractor vehicle (1). By means of trailer control valve (23), brake pressure can be admitted to brake-pressure line (25) via a brake-pressure line (27). Trailer control valve (23) is electrically connected to control device (11). By means of trailer control valve (23), control device (11) can control the brake pressure in trailer vehicle (2), for example, by the fact that the brake-demand value measured by the vehicle-dynamics control system in control device (11) is transformed by appropriate actuation of trailer control valve (23) into a corresponding pressure value.

Furthermore, there is provided in trailer vehicle (2) a device (24), such as, for example, an anti-lock braking system, which provides a wheel-lockup protection function for trailer vehicle (2). Anti-lock braking system (24) is capable, by means of a valve device (29), of modulating the brake pressure fed via brake-pressure line (25) to the trailer vehicle. In other words, it can reduce the brake pressure in the event of lockup risk. For this purpose, anti-lock braking system (24) is electrically connected to speed sensors (31, 32), which are disposed on wheels (30, 33) and by means of which the speeds of wheels (30, 33) can be determined. From the behavior of these speeds, anti-lock braking system (24) can then determine a possible lockup risk.

Anti-lock braking system (24) is connected via an electrical connecting cable (26) to control device (11) in tractor vehicle (1). Electrical connecting cable (26) contains electrical supply conductors as well as a data interface. Via the data interface, anti-lock braking system (24) delivers to control device (11) a series of data signals, such as the mean value (M) of the speeds of wheels (30, 33), the difference value (D) thereof, as well as information on execution of anti-lock control. These and further transmitted data signals are explained in more detail in, for example, ISO Standard 11992 which is incorporated herein by reference.

Figure 3:
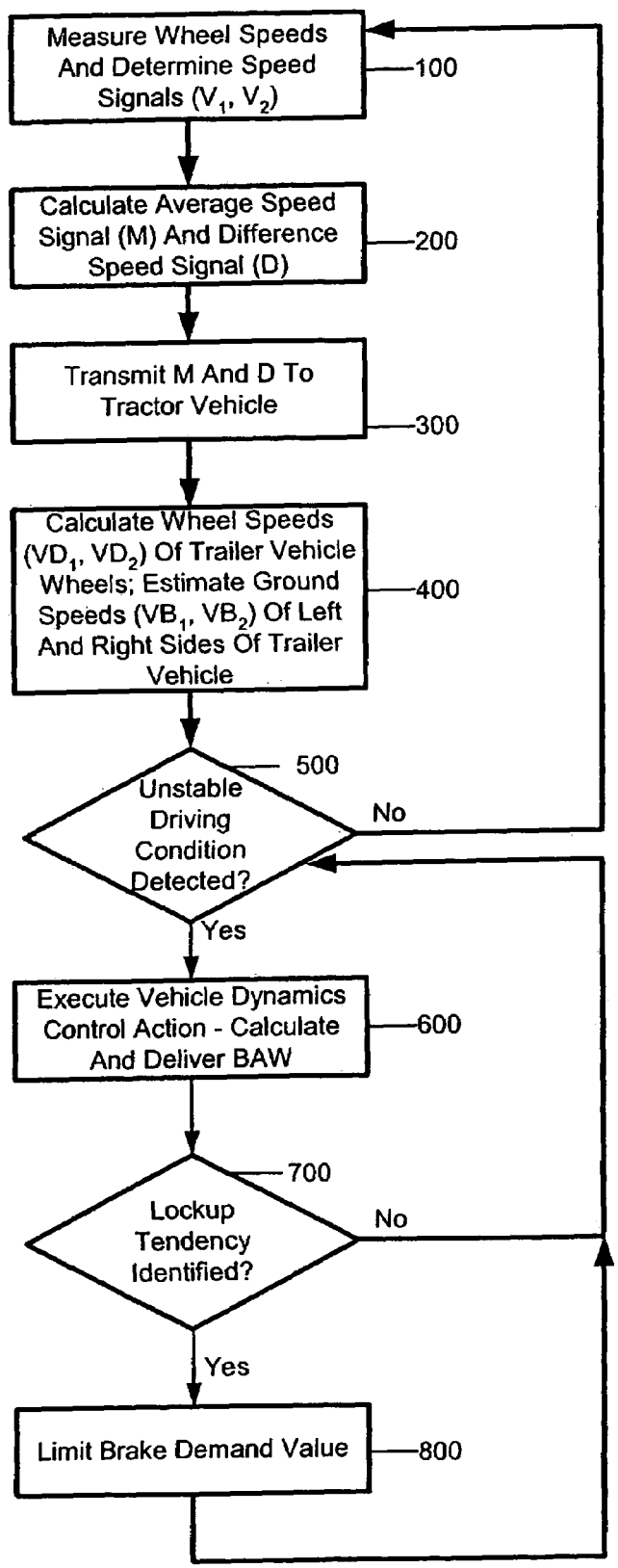
FIG. 3 is a flow chart showing the process flow of a method for controlling the vehicle dynamics of a vehicle train according to a preferred embodiment of the present invention.

Control device (11) executes a series of control algorithms, such as anti-lock protection functions for the front axle of tractor vehicle (1), electronic brake-force distribution between the front and rear axles of tractor vehicle (1), brake-lining wear optimization between the front and rear axles of tractor vehicle (1) and, by means of the integrated vehicle-dynamics control system, a vehicle-dynamics control method. Referring to FIGS. 2 and 3, an explanation will be given hereinafter of part of this vehicle-dynamics control method, which serves to determine the brake-demand value by using the data signals received by trailer vehicle (2) and to deliver the brake-demand value to trailer vehicle (2).

By means of three timing diagrams, FIG. 2 illustrates the time variation of speed signals (FIG. 2a), brake-demand value (BAW) (FIG. 2b) and brake force (FANH) (FIG. 2c) of trailer vehicle (2). In FIG. 2a there are indicated the time variations of a ground speed (VB) of trailer vehicle (2), calculated by the vehicle-dynamics control system, and a wheel speed (VD) determined as a result from the data signals received from trailer vehicle (2).

In trailer vehicle (2), the wheel speeds of wheels (30, 33) of the left and right sides of the vehicle are measured by means of speed sensors (31, 32) in anti-lock braking system (24); and anti-lock braking system (24) determines a speed signal ($v_2$) from the signal of sensor (32) and a speed signal ($v_1$) from the signal of sensor (31) (step 100, FIG. 3). At step 200, anti-lock braking system (24) determines an average speed signal (M) from speed signals ($v_1$, $v_2$) as well as a difference speed signal (D), for example by means of the following formulas:

$$M = \frac{v_1 + v_2}{2} \quad (1)$$

$$D = v_1 - v_2 \quad [2]$$

At step 300, anti-lock braking system (24) transmits the variables (M, D) calculated in this way via the data interface to tractor vehicle (1). Furthermore, information as to whether an anti-lock brake control action is being performed in trailer vehicle (2) is transmitted by anti-lock braking system (24) to tractor vehicle (1).

At step 400, in tractor vehicle (1), the average speed (M) and the difference speed (D) are received and further computational steps are performed. In a first computational step, the wheel speeds of individual wheels (30, 33) of trailer vehicle (2) are reconstructed from these variables (M, D), for example by means of the following formulas:

$$VD_1 = M + \frac{D}{2} \quad [3]$$

-continued $$VD_2 = M - \frac{D}{2} \quad [4]$$

The ground speeds (VB$_1$, VB$_2$) of the left and right vehicle sides of trailer vehicle (2) are estimated by the vehicle-dynamics control system, preferably from the signals of steering-angle sensor (19), of lateral-acceleration sensor (12), of the yaw-rate sensor and of the wheel-speed signals of sensors (5, 6, 17, 18) of the tractor vehicle in such a way that they represent a measure of the speed, relative to the roadway, of wheels (30, 33) equipped with speed sensors (31, 32). Thus, the ground speeds (VB$_1$, VB$_2$) and the previously measured wheel speeds (VD$_1$, VD$_2$) represent physical variables that can be appropriately compared with one another to calculate a difference, for example, for the purpose of determining a measure of the brake slip of trailer vehicle (2).

In this way ground speeds (VB$_1$, VB$_2$) and wheel speeds (VD$_1$, VD$_2$) are used to monitor brake slip on the respective sides of trailer vehicle (2). The sequence explained hereinafter with reference to FIG. 2a is performed separately for the left and right vehicle sides of trailer vehicle (2). In FIG. 2a this is illustrated in simplified form with placeholders (VB, VD), where the variables (VB$_1$, VB$_2$) can replace VB and the variables (VD$_1$, VD$_2$) can replace VD. The deviation of the graph of wheel speed (VD) from the graph of ground speed (VB) in FIG. 2a therefore represents the aforesaid degree of brake slip of one vehicle side of trailer vehicle (2).

In an advantageous configuration of the present invention, a lockup tendency of wheels (30, 33) of trailer vehicle (2) is identified by monitoring the ground speed (VB) of trailer vehicle (2) and the wheel speed (VD) of trailer vehicle (2), determined on the basis of the data signals received from trailer vehicle (2), as soon as VB and VD reach a predetermined deviation ($\Delta$V) from one another (see step 700, FIG. 3). Because brake slip is monitored separately for each side of the vehicle, a lockup tendency is preferably detected when the ground speed (VB) on at least one side of the vehicle deviates by the predetermined value ($\Delta$V) from the wheel speed (VD). For detection of the lockup tendency, it is advantageous to additionally use the information transmitted from trailer vehicle (2) via the data interface as to whether an anti-lock control action is being performed by anti-lock braking system (24).

At step 500, the vehicle-dynamics control system in tractor vehicle (1) determines if an unstable driving condition exists. If no such condition is detected the process revisits step 100. If such a condition is detected, then at step 600 the vehicle-dynamics control system in tractor vehicle (1) executes an appropriate vehicle-dynamics control action in accordance with preprogrammed strategies.

Referring to FIG. 2a, assuming that vehicle (1, 2) is experiencing an unstable driving condition at instant (t1), thus prompting the vehicle-dynamics control system in tractor vehicle (1) to demand braking of the trailer vehicle, the vehicle-dynamics control system delivers a brake-demand value (BAW) with predetermined start value to trailer vehicle (2) via the data interface. The start value can be dimensioned, for example, such that hysteresis effects in the response of the brake system of trailer vehicle (2) are quickly overcome. For the purpose of executing a vehicle-dynamics control action, the brake demand to trailer vehicle (2), represented by the brake-demand value (BAW), is adapted in conformity with the preprogrammed strategy. The strategy can contain, for example, situation-recognition capability, in order to detect a dangerous situation and/or to identify the nature of the instability of the vehicle train, whereby a distinction is made between the conditions of oversteering and understeering, for example. Further influencing variables for the strategy can be an estimated coefficient of friction of the roadway as well as the vehicle-dynamics variables determined by sensors, examples being yaw rate, lateral acceleration and steering angle, as well as variables derived therefrom, such as yaw acceleration and side slip angle.

As illustrated in FIG. 2c, the brake system of trailer vehicle (2) responds at instant (t2), after a system-related delay time ($\Delta$T). At time (t2), therefore, the brake force (FANH) increases steadily from zero value. In other words, the brake force (FANH) lags the brake-demand value (BAW) by the system-related delay time ($\Delta$T). As is evident in FIG. 2a, the application of brake force (FANH) causes the difference between the wheel speed (VD) and the ground speed (VB) measured at the same time on the same side of the vehicle to increase with time. In other words, brake slip develops. The vehicle-dynamics control system observes this brake slip, that is, the difference between the wheel speed (VD) and the ground speed (VB), and monitors this brake slip in case it reaches the predetermined deviation ($\Delta$AV). If the predetermined deviation ($\Delta$V) is reached, a lockup tendency of wheels of trailer vehicle (2) exists. By means of tests, the predetermined deviation ($\Delta$V) can be defined, for example, as such a value that, when it is reached, cornering forces sufficient for stabilization of vehicle train (1, 2) relative to the roadway can still be applied to the wheels of the trailer vehicle in time to prevent lockup.

At step 700, if no lockup tendency is identified, the process according the present invention revisits step 500. If a lockup tendency is identified, then a limit is imposed on the brake-demand value at step 800, and step 500 is revisited.

Assuming that brake slip reaches the predetermined deviation ($\Delta$V) at instant (t3), the vehicle-dynamics control system recognizes this situation and, from that point on, meaning from instant (t3), it imposes a limit on the brake-demand value (BAW) in the form of a maximum value (BAWMAX) that is determined. This maximum value (BAWMAX) is preferably defined as the brake-demand value that has historically occurred when an interval approximately equal to the typical system-related delay time ($\Delta$T) of the trailer vehicle has elapsed after instant (t3). This can be accomplished, for example, by readout from a memory of previous brake-demand values. As is evident from FIG. 2b, the maximum value (BAWMAX) is smaller by the amount ($\Delta$BAW) than the brake-demand value (BAW) existing at instant (t3). Also illustrated in FIG. 2b, by means of the broken line (A), is the further variation of the brake-demand value (BAW) that theoretically would have taken place if the limit had not been imposed.

From FIG. 2c it is evident that the limitation of the brake-demand value (BAW) after the system-related delay time ($\Delta$T) has elapsed leads, at an instant (t4), to a reduction of the brake force (FANH) of the trailer vehicle to a value that corresponds to the maximum value (BAWMAX). As can be seen in FIG. 2a, this brake-force limitation causes the wheel speed (VD) and the ground speed (VB) to approach one another after instant (t4), thus resulting in a reduction of brake slip.

At instant (t5), the brake-demand value (BAW) to be delivered by the vehicle-dynamics control system on the basis of the control strategy becomes smaller than the maximum value (BAWMAX) explained hereinabove. This leads at an instant (t6), after the system-related delay time ($\Delta$t) has elapsed, to a further reduction of the brake force (FANH) of the trailer vehicle. Thereafter, the vehicle train is once again in a stable driving situation, and the process revisits step 100.

Accordingly, the present invention provides an improved method and system for controlling the vehicle dynamics of a vehicle train in which vehicle-dynamics signals are obtained from sensors and used to deliver a BAW to the trailer vehicle.

It will thus be seen that the objects set forth above, among those made apparent from the preceding description, are efficiently attained, and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A vehicle-dynamics control method for a vehicle train, the vehicle train including a tractor vehicle and a trailer vehicle, the tractor vehicle having a vehicle-dynamics control system arranged and constructed to deliver a brake-demand value to the trailer vehicle based on vehicle dynamics signals measured in the tractor vehicle, the trailer vehicle having a brake system responsive to the brake-demand value from the vehicle-dynamics control system of the tractor vehicle, the method comprising the steps of receiving in said tractor vehicle at least one vehicle dynamics data signal from said trailer vehicle, and based on said at least one data signal received, calculating a brake demand value.

2. The method of claim 1, wherein said trailer vehicle includes wheels, and further comprising the step of determining wheel speed of at least one of said wheels of said trailer vehicle based on said at least one data signal.

3. The method of claim 1, wherein said trailer vehicle includes wheels, and further comprising the steps of calculating an average value of wheel speeds of two of said wheels of said trailer vehicle, and calculating a difference value representing the difference between said wheel speeds of said two of said wheels, said at least one data signal including at least one of said average value and said difference value.

4. The method of claim 1, wherein said trailer vehicle includes wheels, and further comprising the step of identifying a lockup tendency of said wheels of said trailer vehicle based on said at least one data signal.

5. The method of claim 4, further comprising the step of limiting said brake-demand value to a maximum value when a lockup tendency of said wheels of said trailer vehicle is identified.

6. The method of claim 4, wherein said step of identifying a lockup tendency includes monitoring ground speed of said trailer vehicle and said wheel speed of said trailer vehicle and comparing the difference between said ground speed and said wheel speed against a preselected deviation value.

7. A vehicle-dynamics control method for a vehicle train, the vehicle train including a tractor vehicle and a trailer vehicle, the tractor vehicle having a vehicle-dynamics control system arranged and constructed to deliver a brake-demand value to the trailer vehicle based on vehicle dynamics signals measured in the tractor vehicle, the trailer vehicle having a brake system responsive to the brake-demand value from the vehicle-dynamics control system of the tractor vehicle, the method comprising the steps of receiving in said tractor vehicle at least one vehicle dynamics data signal from said trailer vehicle, and based on said at least one data signal received, calculating a brake demand value, wherein said steps of receiving in said vehicle-dynamics control system at least one vehicle dynamics data signal from said trailer vehicle and calculating said brake-demand value based on said at least one data signal are effected in accordance with ISO Standard 11992.

8. A system for effecting vehicle-dynamics control in a vehicle train, the vehicle train including a tractor vehicle and a trailer vehicle, the system comprising means associated with said tractor vehicle arranged and constructed to deliver a preprogrammed brake-demand value to said trailer vehicle based on vehicle dynamics signals measured in said tractor vehicle, said trailer vehicle having a brake system responsive to said brake-demand value, means for receiving in said tractor at least one vehicle data signal from said trailer vehicle associated with vehicle dynamics, and means for calculating said brake-demand value based on said at least one data signal received from said trailer vehicle.

9. The system of claim 8, wherein said trailer vehicle includes wheels, and further comprising means for determining wheel speed of at least one of said wheels of said trailer vehicle based on said at least one data signal.

10. The system of claim 8, wherein said trailer vehicle includes wheels, and further comprising means for calculating an average value of wheel speeds of two of said wheels of said trailer vehicle, and means for calculating a difference value representing the difference between said wheel speeds of said two of said wheels, said at least one data signal including at least one of said average value and said difference value.

11. The system of claim 8, wherein said trailer vehicle includes wheels, and further comprising means for identifying a lockup tendency of said wheels of said trailer vehicle based on said at least one data signal.

12. The system of claim 11, further comprising means for limiting said brake-demand value to a maximum value when a lockup tendency of said wheels of said trailer vehicle is identified.

13. The system of claim 11, wherein said means for identifying a lockup tendency includes means for monitoring ground speed of said trailer vehicle and said wheel speed of said trailer vehicle and means for comparing the difference between said ground speed and said wheel speed against a preselected deviation value.

14. A system for effecting vehicle-dynamics control in a vehicle train, the vehicle train including a tractor vehicle and a trailer vehicle, the system comprising means associated with said tractor vehicle arranged and constructed to deliver a preprogrammed brake-demand value to said trailer vehicle based on vehicle dynamics signals measured in said tractor vehicle, said trailer vehicle having a brake system responsive to said brake-demand value, means for receiving in said tractor vehicle at least one data signal from said trailer vehicle associated with vehicle dynamics, means for calculating said brake-demand value based on said at least one data signal received from said trailer vehicle, wherein said means for receiving in said vehicle-dynamics control system at least one data signal from said trailer vehicle associated with vehicle dynamics and said means for calculating said brake-demand value based on said at least one data signal comply with ISO Standard 11992.

* * * * *